United States Patent Office 2,729,656
Patented Jan. 3, 1956

2,729,656
ISOLATION OF STEROLS

Charles Manly Berry, Minneapolis, and Sidney E. Miller, St. Paul, Minn., assignors to General Mills, Inc., a corporation of Delaware No Drawing. Application April 28, 1952,
Serial No. 284,822

9 Claims. (Cl. 260—397.25)

The present invention relates to a process of isolating sterols from fatty oils and fatty oil residues, principally from vegetable oils and vegetable oil residue.

Sterols are found in minute quantities in fatty oils and particularly in vegetable oils. A variety of methods have been used for the isolation of sterols, all of which have been subject to serious handicaps. The typical laboratory procedure involves the saponification of the oil with aqueous alcoholic alkali for the purpose of converting the glycerides into water-soluble soaps. The saponification mixture is then extracted with a water immiscible solvent which removes the unsaponifiable material, including the sterols, from the aqueous reaction mixture. Inasmuch as this method involves the treatment of the whole oil, it is evident that very large volumes of solvents are necessary for the recovery of minute quantities of sterols. In addition, the extraction of the aqueous saponification phase entails numerous operational difficulties due to the tendency of such systems to form emulsions with the water immiscible solvent.

Methods have been devised to overcome the difficulties due to the formation of emulsions, by extracting a solid soap phase instead of an aqueous soap phase. For example, in one variation, calcium soaps are prepared by adding calcium oxide or calcium chloride to the saponification mixture to form calcium soaps. The sterols which are adsorbed on the calcium soaps are recovered by extraction after drying the soaps. This method, however, is subject to the disadvantage that, the recovery of the fatty acids from the calcium soaps is a difficult process involving the formation of large amounts of calcium sulfate.

A further method which has been proposed involves the preparation of dried sodium soaps obtained by saponifying oils with sodium hydroxide. The entire saponification mixture is dried to produce the soaps used for extraction. The physical structure of these sodium soaps is likely to be such that solvent extraction is not conveniently possible. For example, the sodium soaps prepared in the above manner from distillation residues of fatty acids, a source commonly employed for the recovery of sterols, are gel-like materials containing tars which on drying form waxes which cannot be effectively extracted to separate the sterols.

The present invention involves the formation of a crystallized sodium soap containing crystalline sterols and the extraction of this mixture for the recovery of the sterols. It has been found that when the soaps are in this crystallized condition the sterols are readily extractable and, in addition, the sterols are obtained in a greater purity since tarry constituents of fatty acid residues do not crystallize out or separate out with the crystallized soaps.

It is therefore an object of the present invention to provide a novel method of recovering sterols from fatty oils and fatty oil residues in which the soaps are converted to solid crystalline materials and the sterols extracted therefrom.

This and other objects of the invention will be more fully apparent from the following description thereof.

A wide variety of starting materials may be employed for the present invention. Animal and vegetable oils may be employed, but are not preferred, in view of the relatively low concentrations of sterols therein. Various residues resulting from fatty oil processing are found to be a more desirable source, both from the standpoint of concentration of sterols and also from the standpoint of cost. For example, when fatty oils are subjected to an alkaline refining process for the purpose of removing free fatty acids, it is found that a very large percentage of the sterols become adsorbed or otherwise associated with the soap stock and, as a result, the soap stock contains a concentration of sterols which is several times the concentration of the sterols in the original oil. Accordingly, soap stock is a suitable starting material for the present invention.

There are, however, other preferred materials as will be seen from the following. Soap stock is frequently used as a source of fatty acids. The soap stock is acidulated and the liberated fatty acids are subjected to a distillation operation for recovery in a pure form. The undistillable material, frequently referred to as still bottoms or as vegetable residue when it is derived from vegetable oils, remaining after this distillation operation is found to contain most of the unsaponifiable material in the original soap stock. Thus, in the recovery of fatty acids from soap stock a further substantial increase in concentration of the sterols is obtained. Accordingly, such vegetable residues are a preferred starting material.

Other suitable starting materials include the residue left when whole fatty oils are hydrolyzed and the majority of the fatty acids are distilled off. Another preferred starting material is the deodorizer sludge or catch-all distillate. These materials are distillates or entrained material which are usually found in the condensers of the equipment used in fatty oil deodorization operations. Other suitable materials include tank settlings and other residual materials commonly included in the term "foots." These materials are found to be considerably higher in sterol concentration than is the oil from which the materials are obtained.

For most efficient recovery of the sterols, the starting material should not have been subjected for any extended period of time to any previous processing at temperatures in excess of 500° F. and preferably not in excess of 485° F. For example, in the recovery of fatty acids from soap stock by the acidulation and distillation method, it is preferred that the distillation be terminated before pot temperatures exceed 485° F. In addition, it is preferred that the distillation be conducted so that the undistilled residue amounts to from 5 to 15 per cent in the case of a residue derived from a whole oil or 20 to 25 per cent in the case of a residue derived from soap stock. When the starting material for the present process constitutes the above percentage of the starting material, it is found that the quantity of sodium soaps involved in the processing is optimum for ease of operation and for maximum yield of sterols.

The process involves, first, the saponification of the starting material with alcoholic alkali, either sodium or potassium hydroxide. As the alcohol, methanol is preferred because of its ready availability, unrestricted, and at a low price. Other lower aliphatic alcohols, such as ethanol and propanol, may however be used. The alcoholic alkali employed should be essentially anhydrous and the quantity of alkali should be from 10 to 20 per cent in excess of that required to saponify the starting material. Likewise, the methanol should be employed in a quantity of from 2 to 4 times the weight of the starting material. The saponification may be carried out in a conventional manner as, for example, at reflux temperature. This saponification serves to convert to alkali metal soaps not only the free fatty acids but also any esters which may be present, such as glycerides and esters resulting from reaction between sterols and free fatty acids during the distillation operation.

When the saponification is conducted under the conditions above described and the saponification mixture cooled to room temperature or slightly below (20 to 25 C.), a mixture of soaps and sterols crystallizes out which mixture may then be filtered off and dried, for example, at 50 to 60° C. to remove the alcohol. Thereafter, the sterols may be readily extracted, using either ethylene dichloride or acetone as the solvent. It has been found that it is not necessary that all of the soaps be crystallized in order to obtain high yields of the sterol. When the process is conducted as above described, only a portion of the soaps will precipitate. The exact amount will vary with the nature of the starting material and the temperature to which the saponification mixture is cooled. Under the optimum opererating conditions, the sterols which have a low solubility in the alcohol are almost completely crystallized while at the same time less than one-third of the soaps separate out as crystals. Thus, there is a further concentration of the sterols. Accordingly, the quantity of soap to be extracted is less and, in addition, the sterols are not occluded in the soaps but are present as separate crystalline entities. These are further advantages over the processes in which the entire saponified mass is evaporated to dryness. Furthermore, any tarry materials which are present in the starting material remain dissolved in the alcohol and do not interfere with the extraction or purification of the sterols.

As was pointed out above the alcoholic alkali should be substantially anhydrous. Small quantities of water can be tolerated but if the quantity of water in the saponification mixture is in excess of 5 per cent by weight based on the methanol the soaps tend to be gelatinous and on drying form case hardened cakes or particles which cannot be penetrated by the extracted solvent.

Ethylene dichloride and acetone may be used as solvents. Of these, the ethylene dichloride is preferred for reasons which will be pointed out hereinafter. Other solvents, such as benzene carbon tetrachloride, methyl ethyl ketone and methyl iso-butyl ketone are not suitable. While these materials are good solvents for the sterols and do not substantially dissolve the soaps, they tend to break up the soaps into very fine or colloidal particles which prevents satisfactory filtration and separation of the extracts. The sterols can be recovered in better than 90 per cent purity by concentrating the ethylene dichloride extracts until the concentration of the total unsaponifiables and sterols present is between 10 and 20 per cent. The extracts are then treated with filteraid, filtered to remove traces of colloidal soaps and the filtrate treated with from 1 to 2 per cent water. On cooling the filtrate treated with water, the sterols precipitate out as hydrates which can be filtered off and dried to yield the pure sterols. In case acetone is used as the solvent the sterols may likewise be recovered by the addition of water, but this is less desirable since the addition of the water to the water miscible acetone changes the solution characteristics of all of the materials in the extract and, as a result, some non-sterol unsaponifiable material may precipitate along with the sterols. Accordingly, the product is of a lower purity.

*Example 1*

Acidulated soybean oil soap stock was subjected to distillation at temperatures below 500° F. During the major portion of the distillation, the temperature was maintained within the range of 450 to 485° F. The residue remaining after distillation amounted to approximately 20 per cent of the acidulated soap stock starting material.

701 parts of this residue which had an acid value of 45.0 and a saponification value of 136.0 was saponified by refluxing it with 75 parts of sodium hydroxide and 960 parts of anhydrous methanol. The portion of the saponification mixture corresponding to 100 parts of the original residue was diluted with methanol until the ratio of methanol to saponified residue was 4:1 by weight. The diluted mixture was allowed to stand for several hours at room temperature. 27 parts of a soap-sterol mixture crystallized out. This mixture was separated by filtration and dried at 60° C. to remove the adsorbed methanol. The dried crystalline mixture was extracted with five separate quantities ethylene dichloride totalling 500 parts. 13 parts of the original crystalline mixture dissolved. A few milleliters of water was added and the solution cooled to 5° C., whereupon 7.1 grams of sterols melting at 135–137° C. crystallized out.

*Example 2*

In this example, a soybean oil soap stock distillation residue was prepared in a manner similar to that of Example 1. The residue in this example, however, had an acid value of 52.0, a saponification value of 143 and a sterol content of 9.3 per cent. 500 parts of this residue was saponified by heating it under reflux with 1,000 parts of methanol containing 56 parts of sodium hydroxide. After saponification was complete, the mixture was divided into two equal portions. One of these was allowed to stand without further dilution, at room temperature (methanol to residue ratio of 2:1). The other portion was diluted with methanol to a methanol to residue ratio of 4:1.

The undiluted portion was allowed to stand at room temperature to yield 97.8 parts of a soap-sterol crystalline mixture. Further cooling of the mother liquor to 5° C. yielded another 22.3 parts of soap sterol crystals. Extraction of these mixtures with ethylene dichloride, and precipitation with water as above described, yielded 18.0 parts of sterol or 77 per cent of the original analyzed sterol content of the residue. To determine the residual sterols in the mother liquor from the second crystallization, this mother liquor was extracted with petroleum ether for the recovery of unsaponifiables. Analysis of this extract for sterols, by the digitonin method, indicated that only 1.93 parts of the 23.3 parts of sterols originally present in this portion of the starting material had not precipitated with the soaps.

The diluted portion of the original saponification mixture on standing at room temperature gave 26.9 parts of a soap-sterol crystalline mixture. Cooling of the mother liquor to 3° C. yielded another 36.5 parts of soap sterol crystals. Extraction of these crystalline materials with ethylene dichloride yielded a solution containing 17.2 parts of sterols or 74 per cent of the sterols originally present in the starting material.

*Example 3*

500 parts of the distillation residue which was used as a starting material in Example 2 were saponified with 54 parts of sodium hydroxide in 1,000 parts of methanol. The mixture was heated for 2¼ hours at reflux temperature, after which the hot solution was divided into two portions. One portion was subjected to an analytical procedure for the determination of the sterol content of the original material. This procedure involved diluting the portion of saponification mixture with water and then extracting with ethyl ether and petroleum ether. A yield of 22.8 per cent unsaponifiables was thus obtained. Analysis of this unsaponifiable material by the digitonin precipitation method showed a concentration of 50.1 per cent sterols in the unsaponifiables. Thus the starting material had a sterol content of 11.4 per cent.

A portion of the saponification mixture equivalent to 400 parts of the original residue was diluted with methanol to the point where the ratio of methanol to residue was 4:1, by weight, and the mixture was allowed to stand at room temperature. 122 parts of a soap-sterol crystalline mixture precipitated and the mixture was filtered off and dried to remove adsorbed methanol. The dried material was extracted three times with 300 parts of ethylene dichloride by mixing the crystalline mixture with the solvent, stirring and filtering on a Buchner funnel. In this manner substantially all of the sterols which had been precipitated with the soaps were extracted. The extracts thus obtained were treated with decolorizing carbon, filtered and treated with 5 parts of water. The addition of water caused an immediate precipitation of sterols. The extract was cooled to 5° C. and the crystals were filtered off and washed with a small amount of cold ethylene dichloride. After drying, the crystals weighed 30.2 parts (7.75 per cent of the original starting material). The product melted at 134–136° C. and had a specific rotation of $[\alpha]_D = -38.1$, indicating that the product was a pure soysterol mixture.

The filtrates from the above crop of sterol crystals were concentrated and further treated with water to yield two additional crops of sterols totaling 7.9 parts. These melted in the range of 130–137° C. The total yield of 38.1 parts amounted to 9.5 per cent of the original starting material or 83.3 per cent of the sterols originally present in the starting material.

*Example 4*

500 parts of the distillation residue used as a starting material in Example 1 were saponified by heating the residue with 88 parts of 85 per cent potassium hydroxide in 1,000 parts of methanol for three hours at reflux temperature. The mixture was allowed to cool to room temperature and, after standing at this temperature for several hours, the mixture was filtered to yield 84.7 parts (16.9 per cent) of a soap-sterol crystalline mixture. The soap-sterol crystalline mixture was dried by evaporation of the alcohol and the dried mixture was extracted with ethylene dichloride to yield a dark solution of sterols. This solution was treated with an acid bleaching earth concentrated and treated with water to give 29.9 parts of sterols. Additional crops of sterols were obtained by further concentration of the extract and precipitation. The total yield of sterols, 42.9 parts, amounted to 8.6 per cent of the original residue.

Saponification with potassium hydroxide has the advantage of producing soaps which are more soluble in the original saponification mixture than are the sodium soaps. Consequently, less soap precipitates with the sterols. However, the color of the ethylene dichloride extract was darker and necessitated the employment of greater quantities of bleaching earth.

The ethylene dichloride used should be dry since the presence of water in the ethylene dichloride has an adverse effect on the character of the crystalline soap being extracted. For example, where dry ethylene dichloride was used for extraction, 31.4 per cent of sterols were obtained and the filtration of the extract from the residual soap proceeded very rapidly. In contrast, when the ethylene dichloride was saturated with water, only 18.2 per cent of sterols were obtained and the soap formed a gummy cake which made filtration of the extract extremely slow. In place of the ethylene dichloride used as a solvent in Examples 1 to 4, acetone may be used under the same conditions. When, however, the extract is diluted with water, the purity of the precipitated sterols is reduced somewhat.

*Example 5*

Whole soybean oil was split and the fatty acids distilled off under the conditions described in Example 1 until a residue was obtained which amounted to 8.8 per cent of the original oil. 500 parts of this residue were saponified by heating with 72 parts of sodium hydroxide in 1,000 parts of methanol. After saponification, the mixture was diluted with methanol until the ratio of methanol to original residue was 2.5:1. On cooling the mixture to room temperature, 278 parts of soap-sterol crystals precipitated which, upon extraction with ethylene dichloride and evaporation of the extracts, yielded 21.2 parts of unsaponifiables containing 8.3 grams of sterols. The methanolic filtrate from the first group of soap-sterol crystals was cooled to 5° C. to yield 44 parts of additional soap-sterol crystals which on extraction gave 10 parts of additional unsaponifiables containing 50.2 per cent sterols or 5.0 parts of sterols.

We claim as our invention:

1. Process of recovering sterols which comprises saponifying a fatty material containing unsaponifiables including sterols with a substantially anhydrous alcoholic alkali, crystallizing alkali metal soaps and sterols from the substantially anhydrous saponification reaction mixture, separating the crystallized soap and sterols and extracting the crystallized soap and sterols with a solvent selected from the group consisting of acetone and ethylene dichloride, and separating the extract from the residual soap, the crystallized soap being maintained substantially anhydrous throughout the separation and extraction.

2. Process according to claim 1 in which the fatty material is the distillation residue of a hydrolyzed vegetable oil.

3. Process according to claim 1 in which the fatty material is the distillation residue of a hydrolyzed vegetable oil deodorizer sludge.

4. Process according to claim 1 in which the fatty material is the distillation residue of vegetable oil foots.

5. Process according to claim 1 in which the fatty material is the distillation residue of vegetable oil soapstock.

6. Process of recovering sterols from a distillation residue of acidulated vegetable oil soapstock, said residue being the distillation residue after recovery of the principal quantity of the fatty acids as distillates and said residue constituting from 20 to 25 per cent of the soapstock and not having been subjected to temperatures in excess of 500° F. for extended periods of time, which comprises saponifying said residue with substantially anhydrous alcoholic alkali, crystallizing the alkali metal soaps and sterols from the substantially anhydrous saponification mixture wherein the saponification mixture contains alcohol in the quantity of from two to four times the weight of the original residue, separating off the crystallized soaps and sterols, removing alcohol from the crystallized soaps and sterols and extracting the soaps and sterols with ethylene dichloride and separating the extract from the residual soap, the crystallized soap being maintained substantially anhydrous throughout the separation and extraction.

7. Process according to claim 6 in which the alcohol is methanol.

8. Process of recovering sterols from a distillation residue, said distillation residue resulting from the distillation of fatty acids in the quantity of from 75 to 80 per cent of acidulated vegetable oil soapstock, said residue not having been heated to temperatures in excess of 500° F. for extended periods of time, which comprises saponifying said residue with substantially anhydrous methanolic alkali, crystallizing alkali metal soaps and sterols from the substantially anhydrous saponification reaction mixture while the saponification reaction mixture contains methanol in the quantity of from two to four times the weight of the original residue, the amount of soaps crystallized constituting approximately one-third of the soaps in the saponification reaction mixture, separating off the crystallized soaps and sterols, removing methanol from and extracting the crystallized soaps and sterols with ethylene dichloride, separating the ethylene dichloride extract, and concentrating the ethylene dichloride extract to the point at which the concentration of total unsaponifiables and sterols is between 10 and 20 per cent, adding 1 to 2 per cent of water based on the weight of the concentrated extract, cooling the extract to precipitate sterols, and separating out the precipitated sterols, the crystallized soap being maintained substantially anhydrous throughout the separation and extraction.

9. Process of separating sterols from a solution of said sterols and ethylene dichloride, said solution containing a total of unsaponifiables and sterols in the concentration of 10 to 20 per cent based on the total weight of the extract, which comprises adding from 1 to 2 per cent of water based on the weight of the extract to precipitate the sterols, and separating the sterols from the extract.

References Cited in the file of this patent

UNITED STATES PATENTS

| | | |
|---|---|---|
| 2,508,220 | Buxton | May 16, 1950 |
| 2,515,041 | Hickman | July 11, 1950 |